F. H. SMITH.
FORTUNE TELLING AND RECORDING MACHINE.
APPLICATION FILED JULY 5, 1907.

1,054,994.

Patented Mar. 4, 1913.

WITNESSES:
C. L. Howe
Geoffrey Holt

INVENTOR,
Frederick H. Smith,
BY
Francis M. Wright,
ATTORNEY.

F. H. SMITH.
FORTUNE TELLING AND RECORDING MACHINE.
APPLICATION FILED JULY 5, 1907.

1,054,994.

Patented Mar. 4, 1913.

F. H. SMITH.
FORTUNE TELLING AND RECORDING MACHINE.
APPLICATION FILED JULY 5, 1907.

1,054,994.

Patented Mar. 4, 1913.
5 SHEETS—SHEET 3.

WITNESSES:

INVENTOR,
Frederick H. Smith
BY
Francis M. Wright,
ATTORNEY.

F. H. SMITH.
FORTUNE TELLING AND RECORDING MACHINE.
APPLICATION FILED JULY 5, 1907.

1,054,994.

Patented Mar. 4, 1913.
5 SHEETS—SHEET 4.

WITNESSES:
C. L. Howe.
Geoffrey Holt

INVENTOR,
Frederick H. Smith,
BY Francis M. Wright,
ATTORNEY.

UNITED STATES PATENT OFFICE.

FREDERICK H. SMITH, OF SAN FRANCISCO, CALIFORNIA, ASSIGNOR TO JOHN L. TISDALE, OF ALAMEDA, CALIFORNIA.

FORTUNE TELLING AND RECORDING MACHINE.

1,054,994.     Specification of Letters Patent.     Patented Mar. 4, 1913.

Application filed July 5, 1907. Serial No. 382,194.

*To all whom it may concern:*

Be it known that I, FREDERICK H. SMITH, a citizen of the United States, residing at San Francisco, in the county of San Francisco and State of California, have invented new and useful Improvements in Fortune Telling and Recording Machines, of which the following is a specification.

The object of the present invention is to provide mechanical means for telling fortunes, and by means of which, in a single fortune-telling operation, a large number and variety of statements may be made and events predicted.

A further object of the invention is to provide means whereby from the machine, there may be obtained, if desired, a record of the fortune told thereby.

A further object of the invention is to provide a construction in such a machine whereby new record rolls may be substituted in the machine for the old rolls without permitting access to the money box of the machine, thus preventing the attendants of the place of amusement from fraudulently removing the contents of the money box.

A further object is to provide means whereby the recording mechanism can be changed to correspond with such changes as may be found desirable in the position of the cards on the machine, so that if, for instance, the cards should be found to be so arranged that an unfavorable fortune is displayed too frequently, the same may be remedied by proper adjustment.

A further object is to prevent any person obtaining a second record, by making a second impression from the type, without completing the movement of the machine and without operating the machine a second time.

In the accompanying drawing.

Figure 1:
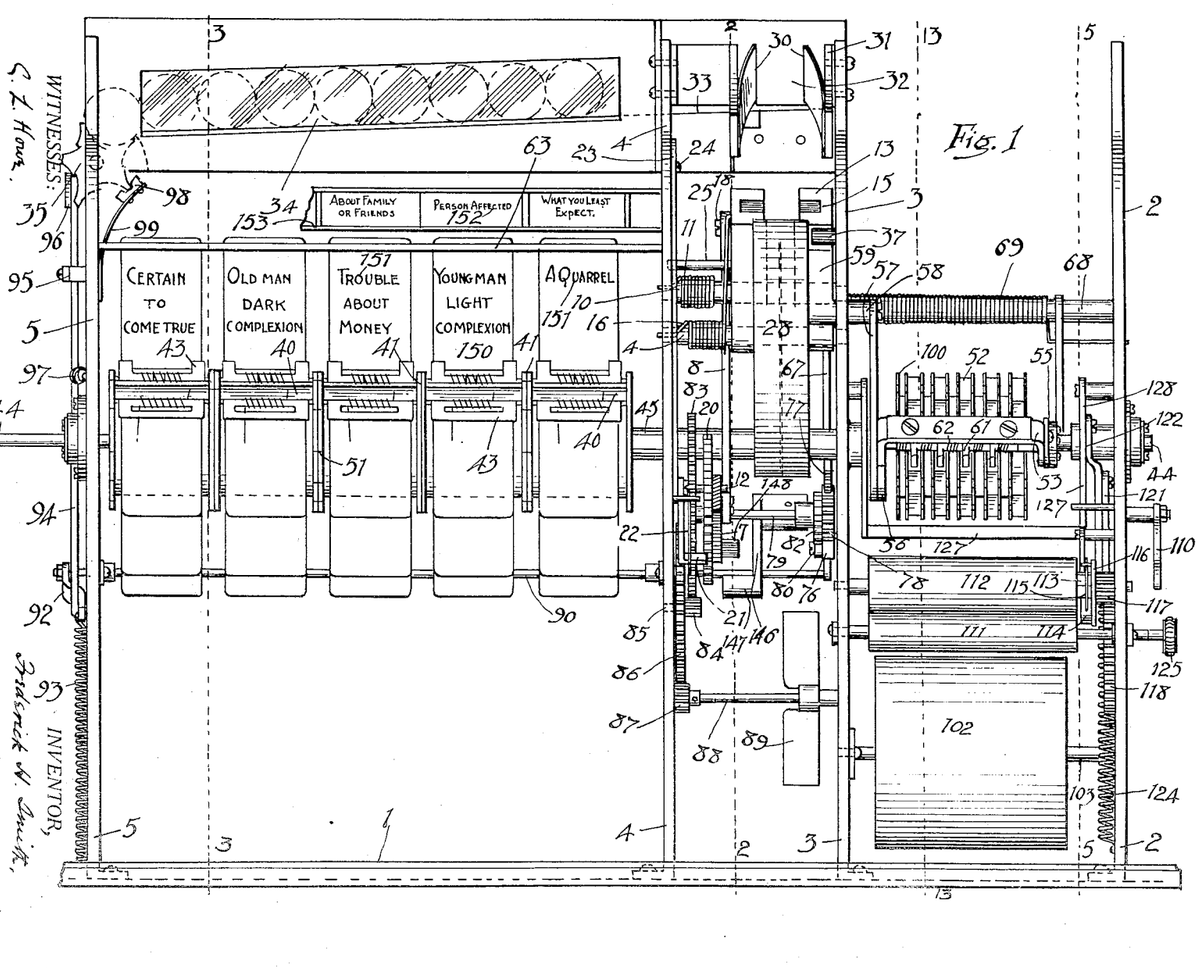
Figure 1 is a front view of the machine, the casing being removed.

Supported upon a suitable base 1 are four vertical frame plates 2, 3, 4, 5, (Fig. 1). Between the plates 4 and 5 is located the display mechanism; between the plates 2 and 3 is located the recording mechanism; and between the plates 3 and 4 is located the initial operating mechanism.

Figure 2:
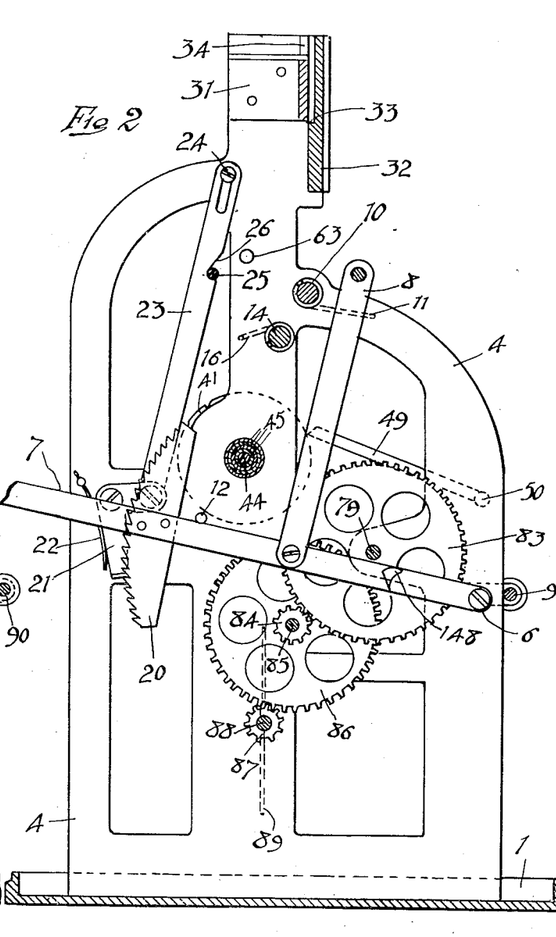
Fig. 2 is a section on the line 2—2 of Fig. 1 looking to the left.
Figures 5, 6, 7, 8:
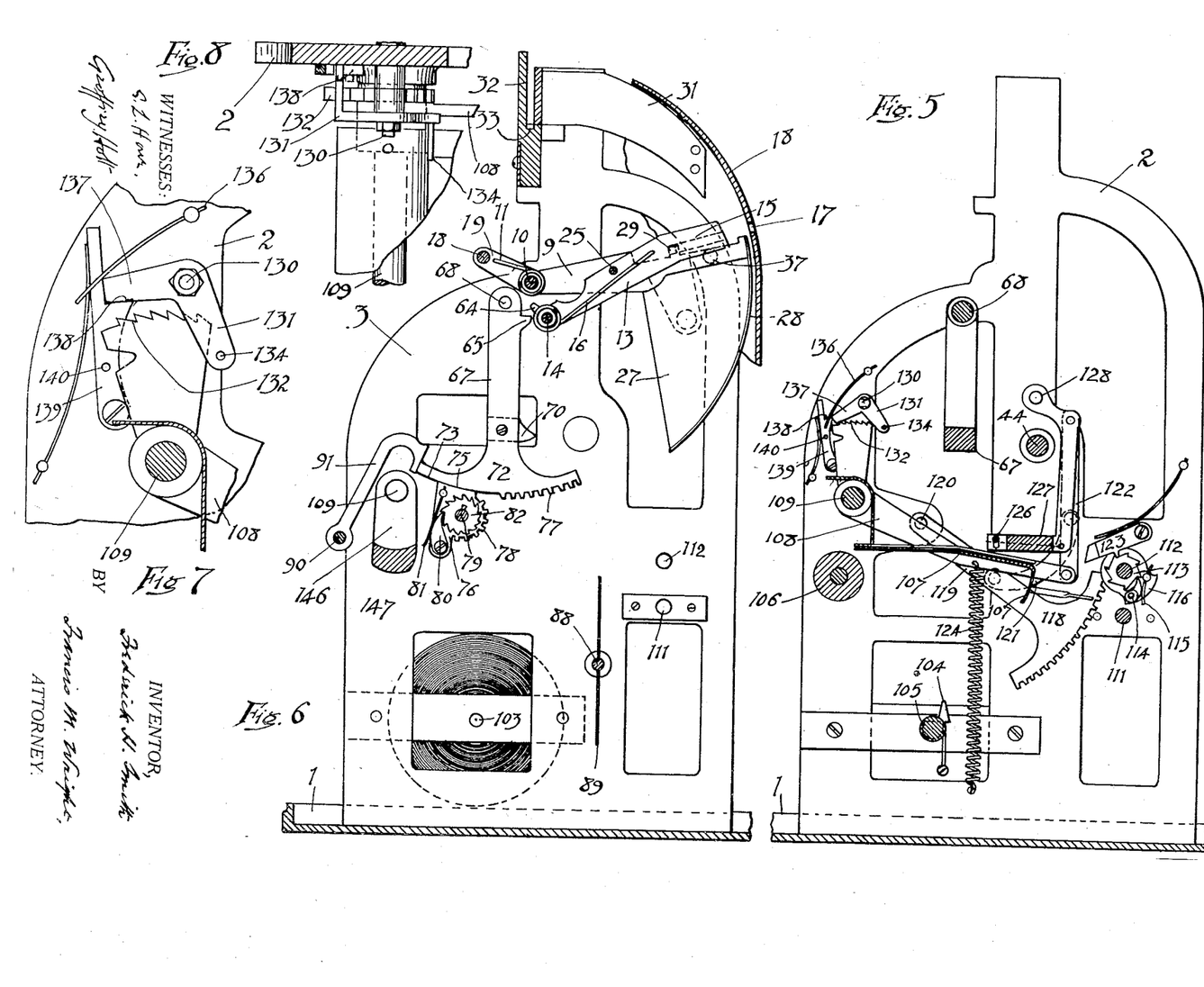
Fig. 5 is a section on the line 5—5 of Fig. 1, looking to the right.
Fig. 6 is a section on the line 6—6 of Fig. 1, looking to the right.
Fig. 7 is an enlarged detail view of the mechanism of controlling the movement of the recording sheet.
Fig. 8 is a broken plan view of the same.
Figures 9, 10, 11, 12:
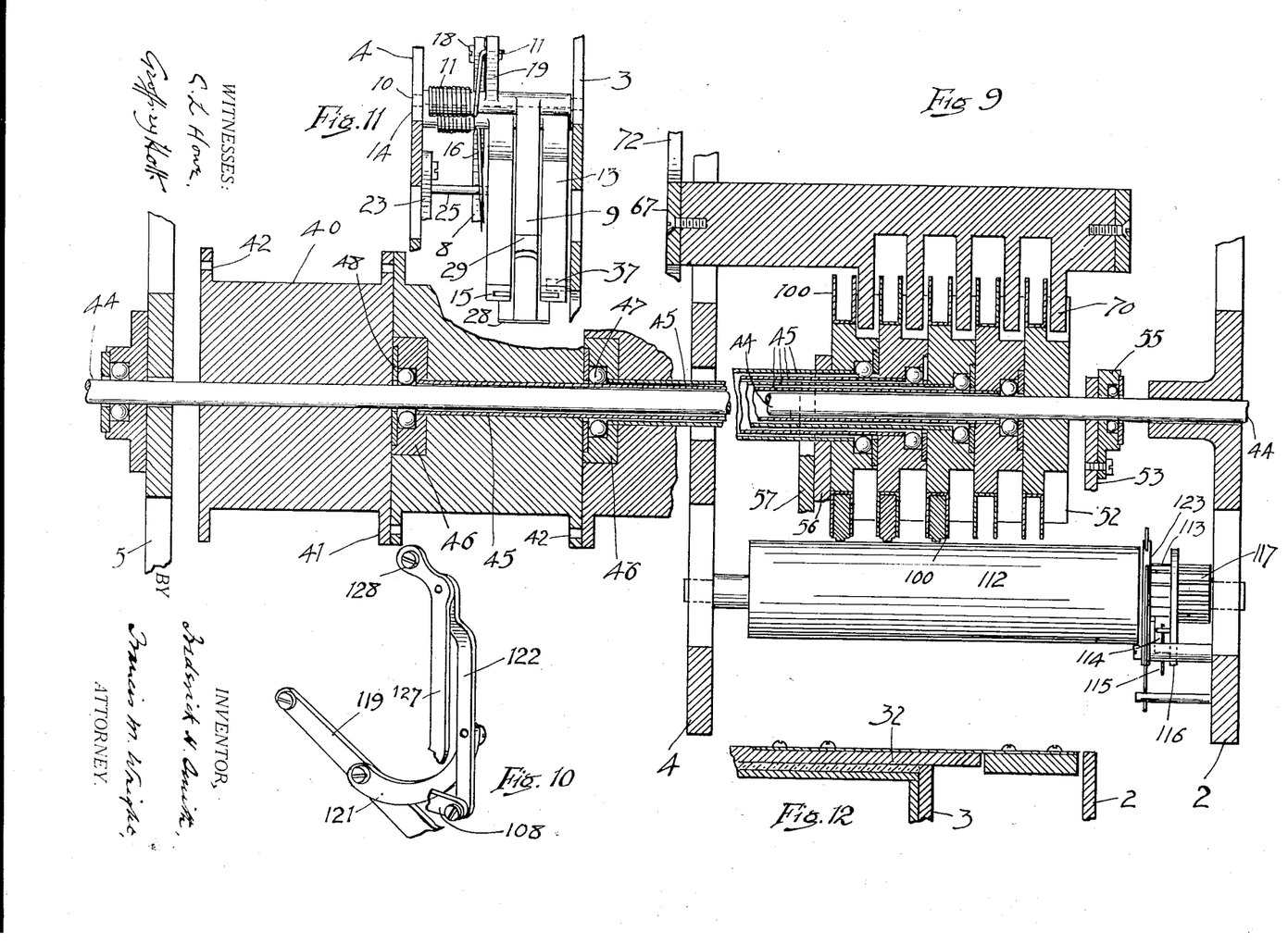
Fig. 9 is an enlarged broken longitudinal section showing the connections of the card carriers and the type carriers.
Fig. 10 is a perspective view of part of the recording mechanism.
Fig. 11 is a broken plan view of the coin receiving mechanism.
Fig. 12 is a detail horizontal section of part of the coin receiving mechanism.
Figure 13:
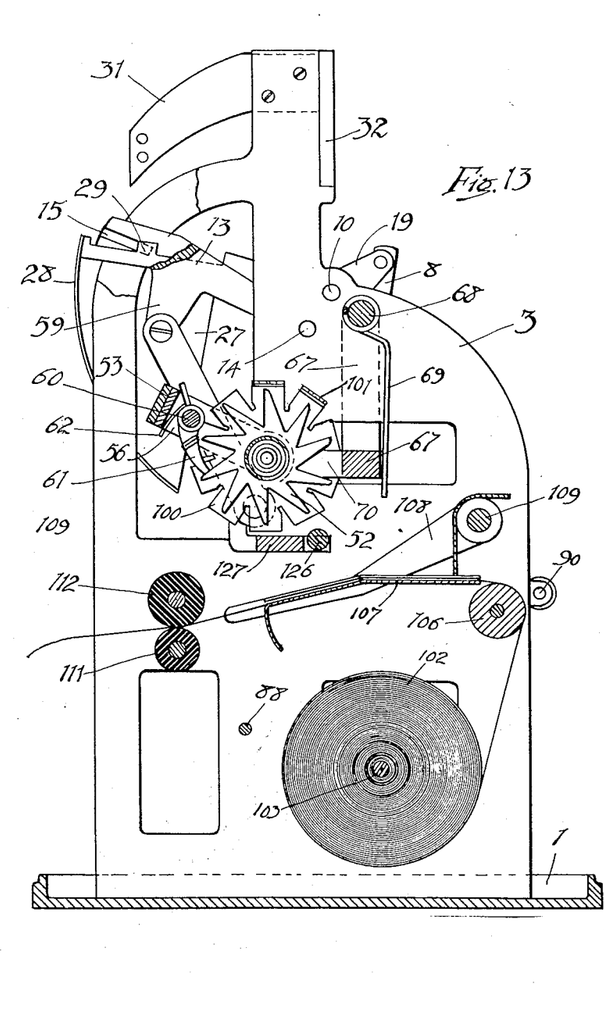
Fig. 13 is a vertical section on the line 13—13 of Fig. 1, looking to the left.
Figure 14:
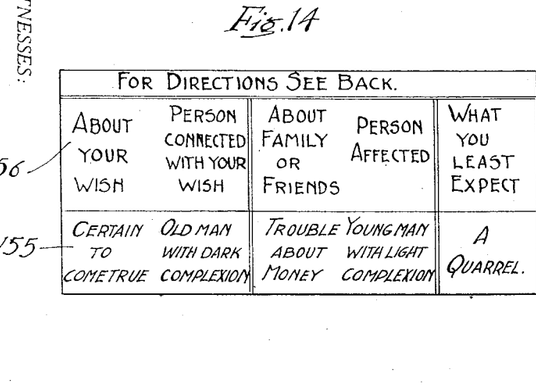
Fig. 14 is an enlarged front view of the record obtained from the machine.
Figure 15:
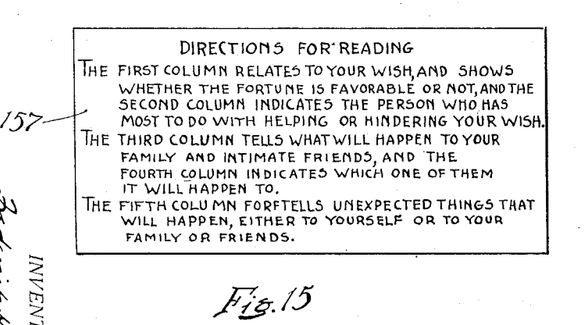
Fig. 15 is a rear view of the same.

Mounted upon a stud shaft 6 (Fig. 2) extending from the side of the frame 4 is a starting arm 7, which is connected by a link 8 with an arm 19 (Fig. 6) on a rock shaft 10 mounted between the frames 3 and 4 and carrying a pusher arm 9. The depression of the said starting arm rocks the shaft 10 so as to move the pusher arm 9 upward and rearward. A spring 11 coiled around the shaft 10 resists the upward and rearward movement of the pusher arm, and restores it to its original position when released, thereby also restoring to its original position the starting arm 7. A stop pin 12, (Fig. 2), extending from the side of the plate 4, limits the return movement of said starting arm. The said pusher arm 9 in its upward and rearward movement swings between a forked coin carrier 13, which is mounted on a rock shaft 14 extending between the plates 3 and 4, and which is formed at its outer or free end with oppositely facing grooves 15 forming a pocket for a coin, Figs. 1, 6, 8. When no coin has been placed in said pocket the pusher arm swings freely through said forked carrier, but when through a suitable slot 17 in the outer casing 18, (Fig. 6), a coin is deposited in said pocket, on account of the edge of the coin resting in the grooves of the pocket, said pusher arm can no longer swing freely through said carrier, but impinges against the coin in the carrier, and, consequently, the upward and rearward movement of the pusher arm imparts also an upward and rearward movement to the carrier. This movement is now resisted not only by the coiled spring 11, but also by a spring 16 coiled around the rock shaft 14.

It is desirable to insure that, when a coin has been deposited in the pocket of the carrier and the starting arm has been sufficiently depressed, said arm can not return until said carrier has fully completed its movement. For this purpose there is attached to the starting arm a curved segmental rack 20 (Fig. 2) and adapted to engage said rack is a dog 21 pivoted on the frame plate 4, and adapted to be moved into engagement with said rack by a spring 22. However, at the commencement of the operation, said dog is held out of engagement with said rack by means of a pitman 23 connected at its lower end to an arm of said dog and at its upper end formed with a slot by which it is guided on a screw 24 screwed into the plate 4, and this pitman is held down by means of a stud 25 upon the side of the coin carrier, (Figs. 1, 2, 6,) which stud engages a notch 26 in the pitman, thereby holding the dog out of engagement with the rack. When, however, the carrier has been moved to a sufficient distance, said stud 25 being moved by said carrier, is lifted from said notch 26, and the spring 22 is free to act, raising the pitman 23 and moving the dog into engagement with the rack. And thereafter the engagement of the dog with the rack prevents the upward movement of the rack, that is, prevents the return movement of the starting arm, until the dog is again released from the rack by the engagement of the stud 25 with the notch 26 in the pitman upon the return of the carrier. It is also desirable to close the opening 17 in the outside casing 18 after a coin has been deposited and the starting arm has been actuated, to prevent putting a coin into the machine, until the parts are again in a proper position to receive the same, and for this purpose to the pusher arm 9 is secured a segment 27 (Fig. 6), on the edge of which is secured a curved plate 28, which, in the movement of the pusher arm, travels immediately behind the slot 17 in the casing, and maintains said slot closed.

Considering now the upward and rearward movement of the pusher arm, and the carrier pushed thereby through the medium of the coin, on referring to the drawing it is seen that the rock shaft 10 of the pusher arm is arranged above the rock shaft 14 of the carrier, and in consequence of these two elements rotating about centers one above the other, the outer end of the pusher arm moves outward relatively to the carrier as both of them move upward and rearward. Said pusher arm is formed with a shoulder 29 (Figs. 6, 8,), and it is by this shoulder that the coin is arrested when dropped into the pocket of the carrier. In consequence of the pusher arm and carrier rotating about different centers, as just described, and this shoulder moving outward relatively to the carrier as said carrier moves upward and rearward, it results that the coin is gradually pushed out of the pocket. Therefore at a certain point in the upward and rearward movement of the carrier, the coin is discharged from the pocket, being still, however, carried upward and rearward on the end of the pusher arm. But since the carrier was rocked only through the medium of the coin, and the coin has not been removed from the carrier, said carrier is free to return, which it does under the action of the spring 16. A stud 37 (Figs. 1, 6,), secured upon the plate 3 limits the return movement of the coin carrier. It is this return movement of the carrier which imparts motion to the card carriers, as will be presently described. Before proceeding to the description of this part of the apparatus, however, it may be stated that the coin still continues to be carried rearward by the pusher arm, and moves with its edge in contact with two converging spring plates 30 (Fig. 1), secured at their front ends to the sides of a curved guideway 31, their free ends terminating at a short distance from a wall 32, and when said pusher arm has carried the coin to the ends of said plates, and against the the wall 32, said coin is freed from said plates, which then spring toward each other. When the operator removes the pressure on the starting arm, the pusher arm drops back. This it can do because the rack 20 carried by said starting arm is no longer engaged by the dog 21, since the carrier has already returned and in its movement the stud 25 on the said carrier has engaged the notch 26 in the pitman and has removed said dog from said rack. When the pusher arm 9 carrying the coin is moved to the limit of its upward and rearward movement, it abuts against a movable floor 36 supported by a spring 37, so as to yield rearwardly. It thereby presses said floor 36 rearwardly and takes its place. But when the pusher arm returns, the coin itself does not return, being prevented doing so by the ends of the spring plates 30. It is then supported by the movable floor 36 as the latter takes the place of the pusher arm on the return movement of the latter. The coin then rolls from said floor 36 on to a runway 33 which is inclined downward to the left of the machine, upon which runway the coin rolls between two glass windows 34, being arrested at the end by a star wheel 35.

The object of providing the windows at the sides of the runway is to detect the use of "slugs" or counterfeit coins, for by mechanism presently described, at each operation of the machine, one coin is discharged from said runway, and by starting the machine with a sufficient number of coins to nearly fill the runway, the coin last used will first appear at the top of the runway and will be in view from both sides of the machine for a period corresponding to the same number of operations as there are coins in the runway, that is, for a considerable length of time, thus giving ample opportunity to detect the use of a fraudulent token.

I will now describe the mechanism by which the return movement of the coin carrier changes the positions of the card carriers. Said card carriers consist of drums 40, of which there are here shown five in number, each drum having at its end flanges 41 formed with perforations 42 which are adapted to receive the card holders 43. These drums are secured upon a series of nested shafts 44, 45, of which the innermost shaft 44 is solid, while the other four shafts 45 are tubular, and contained one within the other. The innermost shaft 44 is secured to the drum on the extreme left and the hollow shafts 45, proceeding outward, are secured respectively to the drums from left to right in order. It is important that each drum should rotate freely independently of the others, and therefore each of the four drums 40 on the right is attached at its left hand to a hub 46 which runs upon a ring of balls 47 which in turn travel on the next shaft within, being secured in position by a plate 48. In this manner the outer or free end of each drum, that is, the end on the left, has a ball bearing support. As will be seen hereafter, these drums are given a rotation in forward and downward direction, this movement being imparted by the return movement of the coin carrier, and in order to prevent the drums moving backward in the forward movement of said coin carrier, there are provided dogs 49 on a shaft 50, the ends of which dogs drop into notches 51 formed in the peripheries of the flanges of the drums. It is sufficient to provide three of these dogs for five drums, since two dogs may be arranged to engage adjacent flanges of two drums. These nested shafts are secured respectively to five star wheels 52 (Figs. 1, 8,), the outermost shaft being secured to the star wheel on the left, and so on in order. These star wheels are provided with ball bearings to rotate upon the shafts respectively next within them, in precisely the same manner as are the card carrying drums. It is by means of these star wheels that the shafts 44, 45, are rotated, and this is effected in the following manner. 53 indicates a yoke (Fig. 1), one arm of which has secured thereto a sleeve 55 rotating upon the solid shaft 44 while the other arm rotates upon the outermost tubular shaft 45. Said latter arm has a lug or extension 56 to which is attached a link 57 which is connected to a crank arm 58 extending from an arm 59 of the coin carrier. Secured to said yoke 53 is a transverse shaft 60, upon which are mounted five pawls actuated by springs 62, which springs tend to hold the noses of the pawls in engagement with the star wheels, although said pawls can pass freely over the star wheels on the upward and rearward movement of the coin carrier. But upon releasing the coin carrier, when it returns instantaneously under the action of the spring 16, said pawls also move instantaneously forward and downward therewith, and thereby impart a rapid rotary movement to their respective star wheels and therefore also to the nested shafts 44, 45, and to the card-carrier drums attached to said shafts. Thereby said drums, carrying said cards, rotate forward and downward, the free edges of the cards passing successively beneath a rod 63 secured between the plates 4 and 5. Said card carriers do not come to rest by mere friction, but means are provided for positively arresting them. For this purpose there is formed upon the rock shaft 14 a rearwardly extending lug 64 (Fig. 6), which engages a lug 65 on a side of a yoke 67 swinging upon a rock shaft 68, so that the upward and rearward movement of the coin carrier rocks said yoke rearwardly and upwardly, this movement being resisted by a coiled spring 69 around said rock shaft 68. The cross member of this yoke is formed with dogs 70, which normally engage the star wheels, but which are moved away therefrom to permit said star wheels to rotate when the yoke is swung rearward by the rearward movement of the coin carrier. But, when the coin carrier returns, and thereby rotates the card carriers. said yoke also returns under the action of the coiled spring 69, and thereupon the dogs carried thereby pass into the notches of the star wheel and positively arrest the same, and thereby also positively arrest the card carriers. The amplitudes of rotation imparted to the several card carriers depend upon the ease with which the hollow shafts turn, and it is found that the extent of this rotation is always different for the different carriers, the result being that the combination displayed by the cards constantly changes.

Figure 3:
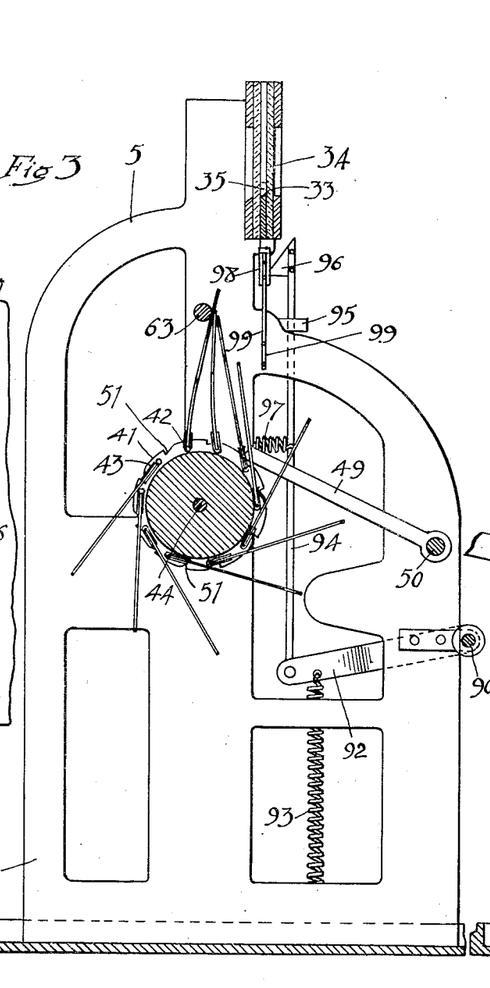
Fig. 3 is a section on the line 3—3 of Fig. 1, looking to the left.

By means of the mechanism as thus far described, the operation of returning the coin carrier to its original position and the dogs 70 into engagement with the star wheels would be instantaneous, and would not allow sufficient time for the card carriers to revolve sufficiently to give a new combination. I therefore provide retarding mechanism, for preventing the instantaneous return of the dogs 70. For this purpose one arm of the yoke 67 is extended downward and carries a segment 72 (Fig. 6), the rear part of the periphery of which is smooth and convex, as shown at 73, and moves against a concave edge 75 of a pawl carrier 76. The front portion of the periphery of said segment is, however, formed with teeth 77, and after said segment has been moved rearward through a certain distance, in which the smooth portion of its periphery moves in contact with the concave edge of the pawl carrier, the teeth of the segment then come into engagement with teeth 78 formed on the pawl carrier, and impart a rotary motion to said pawl carrier. Said pawl carrier is loosely mounted upon a transverse shaft 79 extending between the plates 3 and 4, and carries a pawl 80, which, by means of a spring 81, is moved into engagement with a ratchet wheel 82, secured upon said shaft 79. When the segment moves rearward with the first part of the movement of the coin carrier, and the pawl carrier is rotated thereby, said pawl 80 passes over said ratchet wheel 82 without rotating the same, but upon the return movement of the segment 72 and of the pawl carrier, said pawl then engages the ratchet wheel 82 and rotates said wheel and the shaft 79. On said shaft is mounted a gear wheel 83 (Fig. 2), which engages a pinion 84 upon an intermediate shaft 85 which carries a gear wheel 86 which engages a pinion 87 upon a shaft 88 which carries a fan 89. The motion of the shaft 79 imparts a very rapid motion to the shaft 88, and the resistance of the air against the fan acts as a brake against the shaft 79, and therefore retards the return movement of the dogs 70, allowing sufficient time to the card carriers to rotate to give a new combination. The segment 72 also actuates the mechanism hereinbefore referred to for discharging a coin from the runway at each operation of the machine, this mechanism consisting of a horizontal shaft 90 (Figs. 1, 6) carrying at one end an arm 91 which is engaged by the end of the segment, and at the other end an arm 92 which is normally depressed by a spring 93. To the end of this arm 92 (Figs. 1, 3,), is attached a vertical rod 94 which reciprocates through a slotted bearing 95 and carries at its upper end a tooth 96. When the segment 72 is actuated by the movement of the coin carrier, said arm 92 is rocked, thereby raising the tooth 96 to engage a point of the star wheel 35, and to pass said point, over which it is then drawn by means of a spring 97. Then, upon the return movement of the coin carrier and also of the segment 72, the arm 92 and the vertical rod 94 drop, so that the star wheel 35 is given a partial rotation to discharge a coin from the runway. A stop 98 carried by a spring 99 prevents the backward movement of the star wheel when engaged by said tooth 96.

It will have been understood that for each card-carrying drum there is a corresponding star wheel secured to the shaft of said drum. The number of points of each such star wheel is the same as the number of card-holders carried on its corresponding drum, so that for every card holder there is a corresponding point of the star wheel. Secured to the side of each star wheel is a type-holder 100 arranged to hold a circular series of type blocks 101 (Figs. 1, 8,), adapted to print the same legend as, or one corresponding to that on the card of the card carrier. Hence, as each combination of cards is displayed by the respective card carriers on the operation of the machine, a corresponding combination of type blocks is brought into position to print the legends appropriate to said cards. These type blocks are shown in the drawing on a smaller scale than would be actually employed. They may be of any suitable size. The paper on which said printing is done is supplied from a roll 102 on a shaft 103 (Fig. 8), mounted between the frame plates 2 and 3, said shaft being removably held in position by means of a latch 104 (Fig. 5) which engages a square shoulder 105 (shown in dotted lines) on said shaft. The paper from this roll passes over a roller 106 and then over a plate or guideway 107, which is secured to arms 108 extending from a transverse shaft 109, carrying on its outer end an arm 110, by raising which arm said shaft can be rocked to bring the paper into contact with the type. The paper passes from said plate 107 between two feed rollers 111, 112, of which the lower roller 111, has a shaft extending through the plate 2 and carrying a knob 125 by which it may be independently turned.

Figure 4:
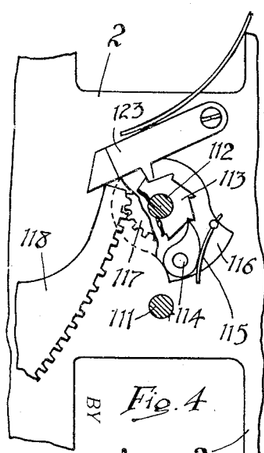
Fig. 4 is an enlarged detail view of the feed roller mechanism.

On the shaft of the upper roller 112 is secured a ratchet wheel 113 (Figs. 4, 5,) which is adapted to be engaged by a pawl 114 held down to said ratchet wheel by a spring 115, said pawl being pivoted on a plate 116 secured to a pinion 117 loose on the shaft of the roller 112. Said pinion is engaged by a segment rack 118 carried on an arm 119 pivoted at 120 on the frame plate 2 and having attached thereto a link 121 which is also attached to a link 122, the lower end of which is attached to one of the arms 108 of the paper-supporting plate 107. Consequently upon the upward movement of the arm 110, by which the plate 107 is moved upward to bring the paper into contact with the type, the segment 118 is also moved upward, causing the pinion 117 to rotate, the pawl 114 carried thereby moving freely over the ratchet wheel of the roller without turning the same, the turning of the roller being prevented by a spring actuated dog 123. But upon the release of said arm 110, and upon the dropping of the plate 107 under the action of a spring 124, said segment 118 drops and the pinion 117 moves in the reverse direction, the pawl 114 then engaging the ratchet wheel 113 and turning the upper roller to advance the sheet. Before pressing the paper against the type it is necessary to ink said type, and this is effected by means of an inking roller 126 (Fig. 8) carried by a yoke 127, the sides of which are suspended, as shown at 128, from the frame plates 2 and 3, one of said sides being pivotally connected with an extension of the link 122. The result is that the first part of the upward movement of the paper-supporting plate 107 causes the inking roller 126 to move rapidly across the faces of the blocks of type which are directed downward, thereby inking said type. Then the paper is brought into contact with said type and an impression is made thereon. Then upon the dropping of the paper-supporting plate away from the type, the paper is fed forward by the feed rollers in the manner already described.

Means are provided for preventing the obtaining of a second record from the machine without again operating the same by means of a coin. For this purpose there is pivoted on a stud shaft 130 (Figs. 5, 7) a pawl 131 which engages a segment rack 132 carried by one of the rocking arms 108 of the paper-supporting plate 107. Upon an arm of said pawl 131 is mounted a pin 134, and in the operation of the machine this pin is moved rearwardly by the yoke 67 and thereby said pawl is lifted out of said segment rack 132 against the action of a spring 136. Said pawl has an arm 137 which, as it is raised out of the segment rack, passes above a notch 138 on a spring-actuated latch 139 and said latch thereby holds said pawl 131 in its raised position disengaged from said segment rack. It is thus held out of engagement after the machine has been operated by means of a coin, so that, after such operation, it is possible to rock the paper-supporting plate, and move the paper to contact with the type to take an impression therefrom. But upon so rocking said plate and taking such impression, the segment rack 132 moves rearwardly and its rear edge engages a pin 140, carried by said latch 139 and thereby moves said latch rearwardly against the action of its spring, and thereby disengages the latch from the pawl 131, which pawl thereupon drops under pressure of its spring 136 and engages the segment rack 132. By the engagement of the pawl with the segment rack, the latter is prevented from moving rearward, and thereby it is also rendered impossible to move the paper-supporting plate a second time so as to take another impression from the type, without first operating the machine by means of a coin in the usual manner.

In order to prevent the taking of an impression from the type before releasing the starting arm, there is secured on the shaft 109 a depending arm 146 having a laterally extending block 147, which, when the starting arm has been moved to the limit of its downward movement, is stopped against forward movement by a lug 148 on said starting arm, which is then immediately in front of said block 147.

The operating mechanism being as above described, the following is the mode of operation: Upon depositing the proper coin, and actuating the starting arm to the limit of its movement, the card carriers are set in rotation, and continue to rotate until arrested by the dogs 70, when certain of the cards, shown at 150, are fortuitously arrested by the rod 63. Each card thus arrested carries a legend 151 which is exposed to the view of the operator, which legends being of a character in correspondence with printed headings 152, supported on a frame 153, are supposed to tell the fortune of the person operating the machine. The operator may also, if he so desires, obtain a record of said fortune by actuating the arm 110, which, in the manner already described, first prints legends 154 identical with those on the exposed cards, upon the record sheet in spaces beneath headings 155 already printed upon the sheet. This record sheet, after being so printed, is advanced by means of the rollers 111, 112 and the projecting portion may then be torn off and preserved as a record. Said sheet is supplied to the machine printed not only with the headings 155 corresponding to those exposed upon the frame 153, but on the back contains printed explanations 157 of the supposed meanings of the legends. These legends may be varied for any one subject in accordance with the number of cards on each card carrier. For instance, in regard to the subject "What you least expect," there may be the statements or legends:—An accident; A visit from an old friend; Loss of money; Money from a distance; A dangerous journey; A favorable journey; A quarrel; A love affair; Sickness; A new friend. Or again, for the first heading, not shown in Fig. 1, which may refer to the subject "About your wish," the cards may contain the legends: Certain to come true; Will not come true; Favorable; Doubtful; Will come true after a while; Would not be good for you; Will bring great happiness; Will not bring happiness; Will happen when least expected; Depend upon your efforts. In connection with the statements fortuitously made by means of the first card carrier, the second card carrier may contain a variety of descriptions of different persons, one of which may be fortuitously displayed.

Many changes in the construction and arrangement may be made without departing from the spirit of the invention. The number of cards shown at one time may be increased or diminished, and some of the less important features of the invention may be omitted in certain cases.

I claim:—

1. In an apparatus of the character described, the combination of a series of nested shafts, a longitudinal series of card carriers attached individually to said shafts at one end, a longitudinal series of star wheels attached respectively to said shafts at the other end, a swinging yoke having pawls adapted to engage said star wheels to rotate the same in the movement in one direction of said yoke, said pawls being adapted to pass over said star wheels when moving in the other direction without imparting rotation thereto, a device, for rocking said swinging yoke, retarding means for retarding the movement of said device, a stop for all of said wheels which normally prevents movement thereof, and means for removing said stop with the movement of said device, substantially as described.

2. In an apparatus of the character described, the combination of card carriers, type carriers, independently connected with the card carriers, type carried by said carriers, means for rotating said card carriers and their respective type carriers in unison, and means independent of said means for taking an impression from the type of said carriers, substantially as described.

3. In an apparatus of the character described, the combination of card carriers, type carriers independently connected with the card carriers, type carried by said carriers, means for rotating said card carriers and their respective type carriers in unison, a lever operable independently of said means, and means actuated in the continuous movement of said lever for first inking said type and then taking an impression therefrom, substantially as described.

4. In an apparatus of the character described, the combination of card carriers, type carriers independently connected with the card carriers, type carried by said carriers, means for rotating said card carriers and their respective type carriers in unison, a lever operable independently of said means, and means actuated in the continuous movement of said lever for first inking said type then taking an impression therefrom on a sheet of paper, and then advancing said sheet, substantially as described.

5. In an apparatus of the character described, the combination of card carriers, type carriers independently connected therewith, type blocks carried by said type carriers, means for rotating said card carriers and their corresponding type carriers, means for locking the latter means to prevent a second operation thereof, and means actuated automatically with the operation of the rotating means for withdrawing said locking means to permit a second operation thereof, substantially as described.

6. In a mechanism of the type described, the combination with a record surface or sheet, of a printing member carrying a series of printing numerals and freely movable by momentum to bring the different numerals into operative printing relation with reference to the sheet, and means whereby the imprint of said numerals may be made on the record sheet.

7. In a mechanism of the type described, the combination with a record sheet, of a printing member carrying a series of printing numerals or distinguishing signs, said member being freely rotatable by momentum to bring the different numerals into operative printing position relative to the record surface, and said printing member being adapted to be operated to impress said numerals on the surface.

8. In a mechanism of the type described, a printing member carrying a series of printing characters and freely movable by momentum to bring the different characters into operative printing position, and means whereby the imprint of said characters may be made, substantially as described.

9. In a mechanism of the type described, a printing member carrying a series of printing distinguishing signs, said member being freely rotatable by momentum to bring the different signs into operative printing position, said printing member being adapted to be operated to print said signs, substantially as described.

In testimony whereof I have hereunto set my hand in the presence of two subscribing witnesses.

FREDERICK H. SMITH.

Witnesses:
C. L. Howe,
D. B. Richards.